(12) United States Patent
Wada et al.

(10) Patent No.: US 12,518,920 B2
(45) Date of Patent: Jan. 6, 2026

(54) MULTILAYER CERAMIC CAPACITOR INCLUDING DIELECTRIC CERAMIC LAYERS INCLUDING RARE EARTH ELEMENT CONCENTRATION REGIONS

(71) Applicant: Murata Manufacturing Co., Ltd., Nagaokakyo (JP)

(72) Inventors: Hiroyuki Wada, Nagaokakyo (JP); Taku Mizuno, Nagaokakyo (JP); Keisuke Araki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 86 days.

(21) Appl. No.: 18/393,765

(22) Filed: Dec. 22, 2023

(65) Prior Publication Data

US 2024/0145170 A1 May 2, 2024

Related U.S. Application Data

(63) Continuation of application No. PCT/JP2022/022553, filed on Jun. 2, 2022.

(30) Foreign Application Priority Data

Jun. 23, 2021 (JP) .............................. JP2021-104172

(51) Int. Cl.
*H01G 4/12* (2006.01)
*H01G 4/30* (2006.01)

(52) U.S. Cl.
CPC ............. *H01G 4/1218* (2013.01); *H01G 4/30* (2013.01)

(58) Field of Classification Search
None
See application file for complete search history.

(56) References Cited

U.S. PATENT DOCUMENTS

| 6,245,433 B1 | 6/2001 | Nakamura et al. |
| 2003/0039090 A1* | 2/2003 | Konaka ................ H01G 4/1245 361/311 |

(Continued)

FOREIGN PATENT DOCUMENTS

| JP | 3334607 B2 | 10/2002 |
| JP | 2003100544 A * | 4/2003 |

(Continued)

OTHER PUBLICATIONS

International Search Report in PCT/JP2022/022553, mailed Aug. 16, 2022, 4 pages.

(Continued)

*Primary Examiner* — Eric W Thomas
(74) *Attorney, Agent, or Firm* — Keating & Bennett, LLP

(57) ABSTRACT

A multilayer ceramic capacitor includes a base body including dielectric ceramic layers and internal electrode layers stacked in a thickness direction, and a pair of external electrodes on first and second end surfaces and electrically connected to the internal electrode layers. The dielectric ceramic layers include, as a main component, crystal grains including a perovskite complex oxide including barium and titanium, and a rare earth element, and include, in a cross section including the thickness direction, a rare earth element high-concentration region in an area proportion of about 50% or more, the rare earth element high-concentration region including the rare earth element in a molar ratio of the rare earth element to titanium of about 0.04 or more and about 0.30 or less.

17 Claims, 4 Drawing Sheets

(56) References Cited

U.S. PATENT DOCUMENTS

| | | | |
|---|---|---|---|
| 2004/0105214 A1 | 6/2004 | Nakamura et al. | |
| 2014/0009864 A1 | 1/2014 | Takashima et al. | |
| 2017/0287635 A1 | 10/2017 | Sakurai et al. | |
| 2019/0237255 A1* | 8/2019 | Sakurai | H01G 4/1227 |
| 2019/0385794 A1 | 12/2019 | Yanagisawa et al. | |
| 2020/0395175 A1 | 12/2020 | Kim et al. | |
| 2020/0411242 A1 | 12/2020 | Hashimoto | |
| 2021/0020376 A1 | 1/2021 | Sasabayashi et al. | |
| 2021/0057156 A1 | 2/2021 | Seo et al. | |
| 2021/0272755 A1* | 9/2021 | Kato | H01G 4/30 |

FOREIGN PATENT DOCUMENTS

| | | |
|---|---|---|
| JP | 2004189588 A | 7/2004 |
| JP | 2007223872 A | 9/2007 |
| JP | 2017178685 A | 10/2017 |
| JP | 2019220678 A | 12/2019 |
| JP | 2020205411 A | 12/2020 |
| JP | 2021009995 A | 1/2021 |
| JP | 2021019100 A | 2/2021 |
| JP | 2021031380 A | 3/2021 |
| WO | 2012120712 A1 | 9/2012 |

OTHER PUBLICATIONS

Written Opinion in PCT/JP2022/022553, mailed Aug. 16, 2022, 5 pages.

* cited by examiner

MULTILAYER CERAMIC CAPACITOR INCLUDING DIELECTRIC CERAMIC LAYERS INCLUDING RARE EARTH ELEMENT CONCENTRATION REGIONS

CROSS REFERENCE TO RELATED APPLICATIONS

This application claims the benefit of priority to Japanese Patent Application No. 2021-104172 filed on Jun. 23, 2021 and is a Continuation Application of PCT Application No. PCT/JP2022/022553 filed on Jun. 2, 2022. The entire contents of this application are hereby incorporated herein by reference.

BACKGROUND OF THE INVENTION

1. Field of the Invention

The present invention relates to multilayer ceramic capacitors.

2. Description of the Related Art

The demand for multilayer ceramic capacitors (MLCCs) has been increasing with decreasing size of electronic devices, such as cellular phones, and increasing CPU speed. The multilayer ceramic capacitor has a structure including dielectric layers and internal electrode layers stacked alternately and has a relatively large capacitance due to its high-permittivity dielectric thin layers even with a small size. Among known multilayer ceramic capacitors produced using a variety of materials, those having dielectric layers made of a barium titanate ($BaTiO_3$)-based compound and having internal electrode layers made of a base metal, such as nickel (Ni), are in wide use because of their low price and high performance.

A reduction in the thickness of dielectric layers is important for making compact, high-capacitance multilayer ceramic capacitors. Unfortunately, a reduction in the thickness of dielectric layers may raise a problem in that the insulation resistance life between internal electrode layers may be shortened, which may lead to degradation of reliability. To address such a problem, a technique for extension of insulation resistance life and improvement in reliability is proposed which includes adding an additive, such as a rare earth element (RE) or magnesium (Mg), to dielectric layers including a $BaTiO_3$-based compound.

For example, Japanese Patent No. 3334607 discloses a dielectric ceramic composition including a main component represented by a specific composition formula and including barium titanate, barium zirconate, magnesium oxide, manganese oxide, and at least one selected from europium gadolinium oxide, oxide, terbium oxide, dysprosium oxide, holmium oxide, erbium oxide, thulium oxide, and ytterbium oxide (see claim 1 in Japanese Patent No. 3334607). Japanese Patent No. 3334607 discloses using such a ceramic composition to form dielectric ceramic layers for multilayer ceramic capacitors having internal electrodes including nickel or a nickel alloy. Japanese Patent No. 3334607 also discloses that when used in a high-intensity electric field, such capacitors can have a high product (CR product) of insulation resistance and capacitance, a high dielectric strength, and high weatherability, such as high temperature resistance or high humidity resistance (see claim 4 and paragraph [0007] in Japanese Patent No. 3334607).

A further reduction in size and a further increase in capacitance have been expected for multilayer ceramic capacitors as electronic components and devices have advanced. As multilayer ceramic capacitors have found wider applications, there has been an increasing demand for improvement in their reliability. Thus, a need exists for multilayer ceramic capacitors have that high insulating characteristics and high reliability with less degradation at high temperature and high humidity even with reduced layer thickness. The technique proposed in the conventional art is effective to a certain extent, but still has room for improvement.

SUMMARY OF THE INVENTION

The inventors of example embodiments of the present invention have conducted intensive studies. As a result, the inventors of example embodiments of the present invention have discovered that reliability of multilayer ceramic capacitors can be remarkably improved by controlling a region including a rare earth element in dielectric ceramic layers.

Example embodiments of the present invention provide multilayer ceramic capacitors with high reliability.

As used herein, the expression "X to Y" refers to a range including the lower and upper limit values X and Y. In other words, the expression "X to Y" is interchangeable with "X or more and Y or less".

According to an example embodiment of the present invention, a multilayer ceramic capacitor includes first and second main surfaces opposite to each other in a thickness direction, first and second side surfaces opposite to each other in a width direction, and first and second end surfaces opposite to each other in a longitudinal direction, a base body including a plurality of dielectric ceramic layers and a plurality of internal electrode layers, the plurality of dielectric ceramic layers and the plurality of internal electrode layers being stacked in the thickness direction, and a pair of external electrodes on the first and second end surfaces and electrically connected to the plurality of internal electrode layers, the plurality of dielectric ceramic layers include, as a main component, crystal grains including a perovskite complex oxide including barium (Ba) and titanium (Ti), and further including a rare earth element (Re), the plurality of dielectric ceramic layers include, in a cross section including the thickness direction, a rare earth element high-concentration region in an area proportion of about 50% or more, the rare earth element high-concentration region referring to an area where a molar ratio (Re/Ti ratio) of a rare earth element (Re) to titanium (Ti) is about 0.04 or more and about 0.30 or less.

According to example embodiments of the present invention, multilayer ceramic capacitors each with high reliability are provided.

The above and other elements, features, steps, characteristics and advantages of the present invention will become more apparent from the following detailed description of the example embodiments with reference to the attached drawings.

DETAILED DESCRIPTION OF THE INVENTION

Example embodiments of the present invention (hereinafter, referred to as the "example embodiments") will be described with reference to the drawings. The example embodiments described below are not intended to limit the present invention and may be altered or modified in various ways without departing from the scope of the present invention.

1. Multilayer Ceramic Capacitor

A multilayer ceramic capacitor according to an example embodiment includes first and second main surfaces opposite to each other in a thickness direction, first and second side surfaces opposite to each other in a width direction, first and second end surfaces opposite to each other in a longitudinal direction, a base body including multiple dielectric ceramic layers and multiple internal electrode layers stacked in the thickness direction, and a pair of external electrodes provided on the first and second end surfaces and electrically connected to the multiple internal electrode layers. The dielectric ceramic layers include, as a main component, crystal grains including a perovskite complex oxide including barium (Ba) and titanium (Ti) and further include a rare earth element (Re). The dielectric ceramic layers include a rare earth element high-concentration region where a molar ratio (Re/Ti ratio) of a rare earth element (Re) relative to titanium (Ti) is about 0.04 or more and about 0.30 or less, in an area proportion of about 50% or more, in a cross section including the thickness direction.

Figure 1:
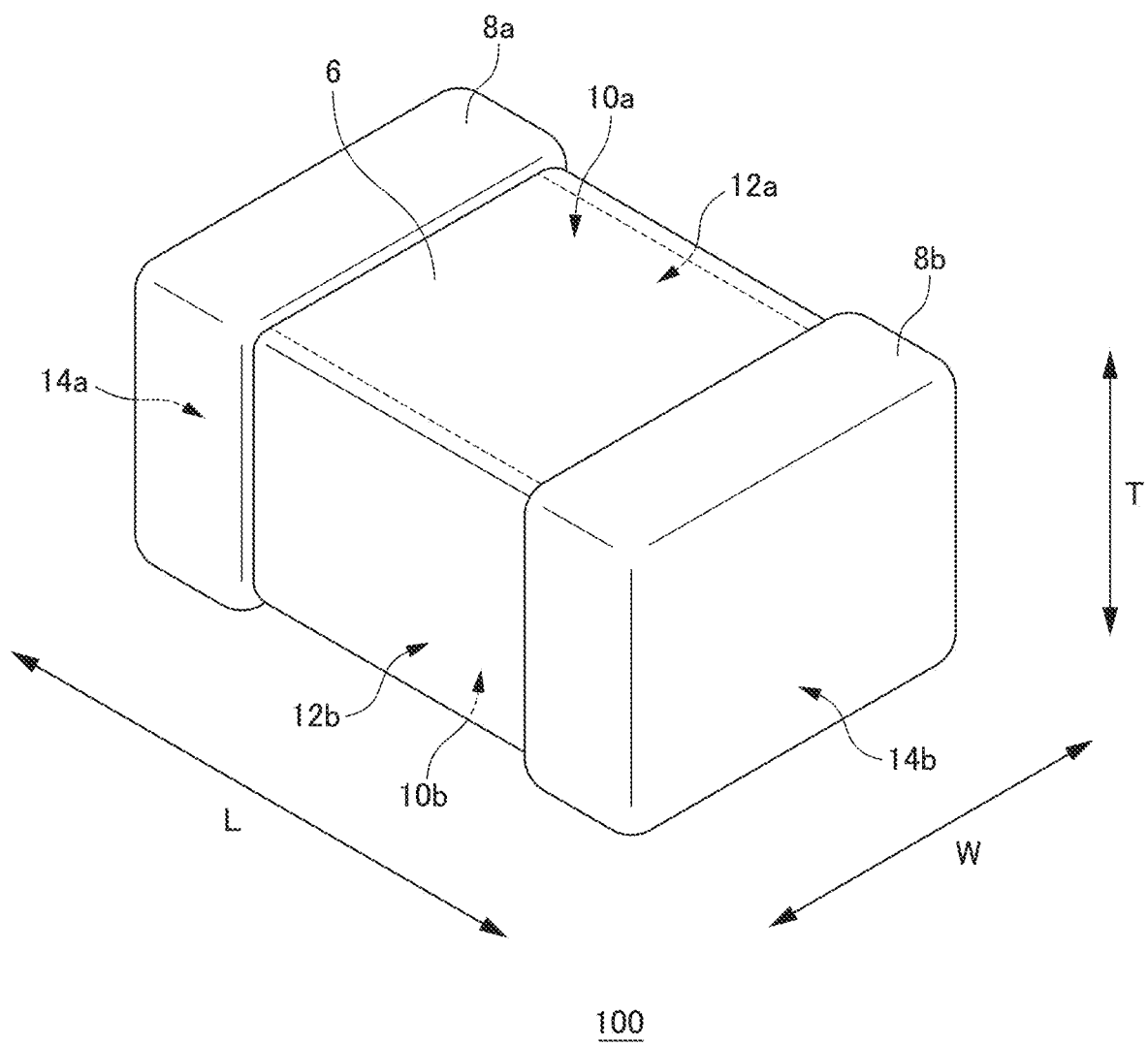
FIG. 1 is a perspective view showing an outer shape of a multilayer ceramic capacitor according to an example embodiment of the present invention.
Figure 2:
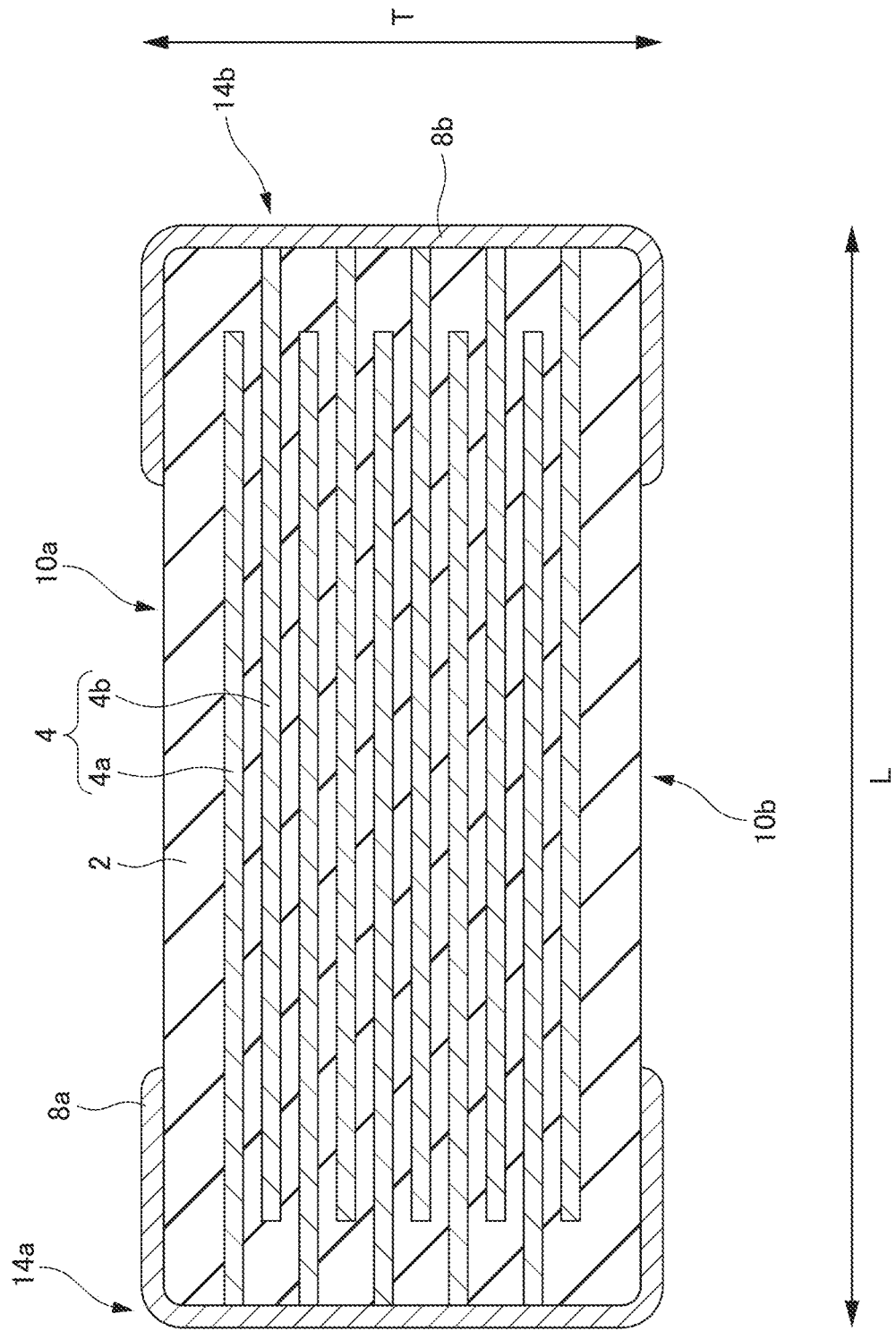
FIG. 2 is a cross sectional view schematically showing an inner structure of a multilayer ceramic capacitor according to an example embodiment of the present invention.
Figure 3:
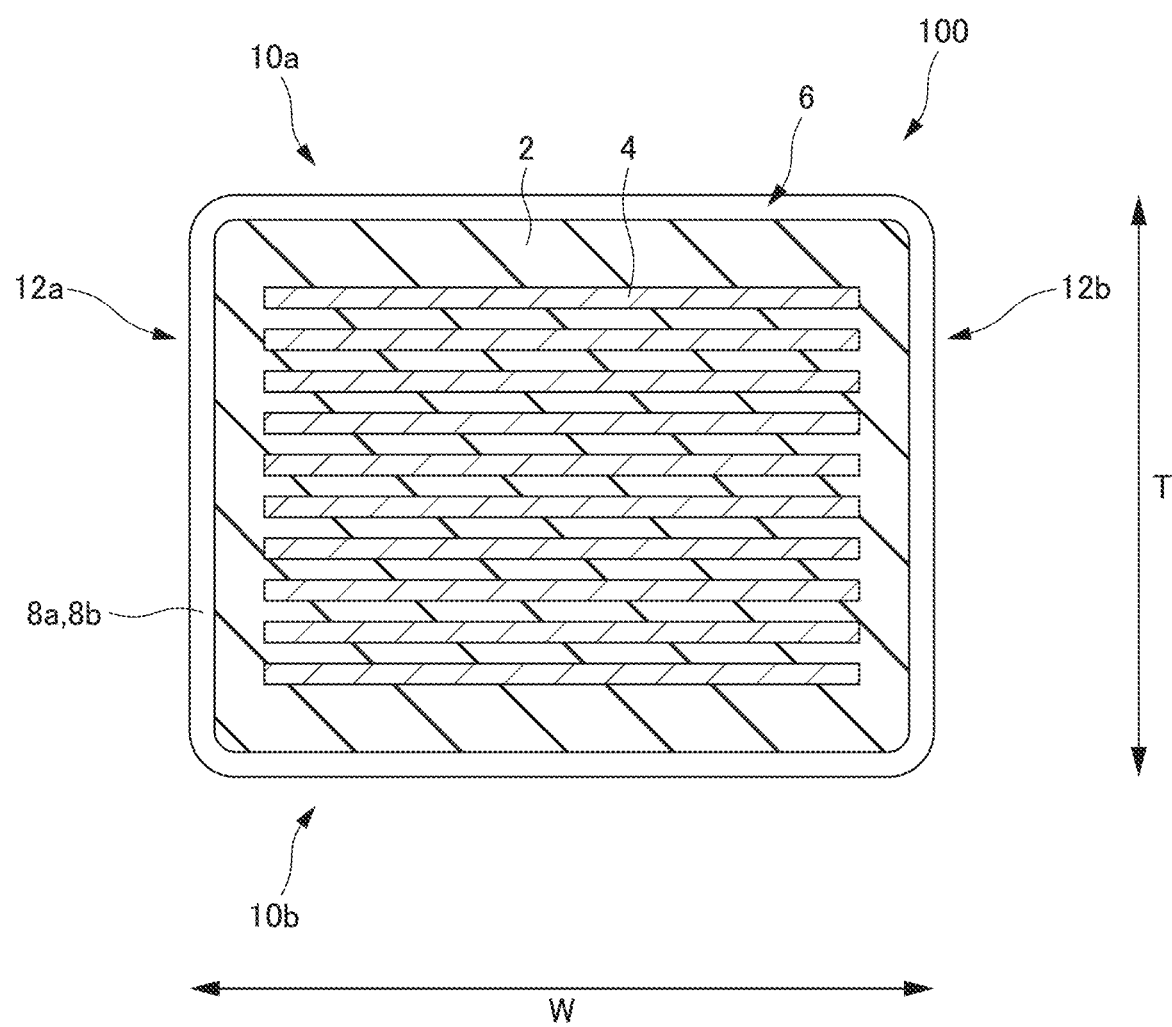
FIG. 3 is a cross sectional view schematically showing an inner structure of a multilayer ceramic capacitor according to an example embodiment of the present invention.

An example embodiment of a multilayer ceramic capacitor will be described with reference to FIGS. 1 to 3. FIG. 1 is a perspective view showing the outer shape of the multilayer ceramic capacitor. FIGS. 2 and 3 are cross sectional views showing the inside of the multilayer ceramic capacitor. The multilayer ceramic capacitor 100 includes a base body 6 including multiple dielectric ceramic layers 2 and multiple internal electrode layers 4, which are stacked on each other, and a pair of external electrodes 8a and 8b provided on the two end surfaces 14a and 14b of the base body 6. The multilayer ceramic capacitor 100 and the base body 6 have a rectangular or substantially rectangular parallelepiped shape. The expression "substantially rectangular parallelepiped" includes not only rectangular parallelepiped but also modified rectangular parallelepiped with, for example, a rounded corner or corners and/or a rounded ridge or ridges. The multilayer ceramic capacitor 100 and the base body 6 include a first main surface 10a and a second main surface 10b, which are opposite to each other in the thickness direction T, a first side surface 12a and a second side surface 12b, which are opposite to each other in the width direction W, and a first end surface 14a and a second end surface 14b, which are opposite to each other in the longitudinal direction L. As used herein, the term "thickness direction T" refers to the direction in which the dielectric ceramic layers 2 and the internal electrode layers 4 are stacked. The term "longitudinal direction L" refers to the direction perpendicular or substantially perpendicular to the thickness direction T and perpendicular or substantially perpendicular to the end surfaces 14a and 14b on which the external electrodes 8a and 8b are provided. The width direction W is perpendicular or substantially perpendicular to the thickness direction T and the longitudinal direction L. The plane including the thickness direction T and the width direction W is called the WT plane. The plane including the width direction W and the longitudinal direction L is called the LW plane. The plane including the longitudinal direction L and the thickness direction T is called the LT plane.

The External Electrodes Include a First External Electrode 8a provided on the first end surface 14a and a second external electrode 8b provided on the second end surface 14b. The first external electrode 8a is provided on the first end surface 14a and may extend over a portion of each of the first and second main surfaces 10a and 10b and the first and second side surfaces 12a and 12b. The second external electrode 8b is provided on the second end surface 14b and may extend over a portion of each of the first and second main surfaces 10a and 10b and the first and second side surfaces 12a and 12b. However, the first and second external electrodes 8a and 8b are not in contact with each other and are electrically separated from each other.

The internal electrode layers 4 include multiple first internal electrode layers 4a and multiple second internal electrode layers 4b. The first internal electrode layers 4a extend to the first end surface 14a and are electrically connected to the first external electrode 8a at the first end surface 14a. The second internal electrode layers 4b extend to the second end surface 14b and are electrically connected to the second external electrode 8b at the second end surface 14b. The first and second internal electrode layers 4a and 4b are opposed to each other with a dielectric ceramic layer 2 therebetween and are electrically separated from each other. Thus, a charge is stored between the first and second internal electrode layers 4a and 4b when a voltage is applied across the first and second internal electrode layers 4a and 4b via the external electrodes 8a and 8b. The stored charge produces a capacitance to enable the capacitor to function.

The multilayer ceramic capacitor 100 may have any dimensions. Preferably, the multilayer ceramic capacitor 100 has a size of, for example, about 0.4 mm or more and about 5.7 mm or less in the longitudinal direction L, a size of about 0.2 mm or more and about 5.0 mm or less in the width direction W, and a size of about 0.125 mm or more and about 5.0 mm or less in the stacking direction T.

Dielectric Ceramic Layers

The dielectric ceramic layers include a ceramic material. The dielectric ceramic layers include, as a main component, for example, crystal grains including a perovskite complex oxide including barium (Ba) and titanium (Ti). Specifically, the main crystal grains include a perovskite complex oxide. These main crystal grains include a barium titanate (BaTiO$_3$)-based compound. Therefore, the dielectric ceramic layers can be said to include a sintered body of the BaTiO$_3$-based compound. BaTiO$_3$ is a perovskite oxide represented by the general formula ABO$_3$. BaTiO$_3$ is a ferroelectric material that has a tetragonal crystalline structure at room temperature and exhibits high permittivity. Thus, the dielectric ceramic material including a BaTiO$_3$-based compound as a main component can have high permittivity and form a high-capacitance capacitor. As used herein, the term "main component" refers to a component the content of which is the highest in the ceramic material. The content of the main component may be, for example, about 50% by mass or more, about 60% by mass or more, about 70% by mass or more, about 80% by mass or more, or about 90% by mass or more.

The barium titanate (BaTiO$_3$)-based compound may be any type as long as it is a perovskite complex oxide including barium (Ba) and titanium (Ti) as main components. Specifically, for example, the compound may be BaTiO$_3$ or partially substituted BaTiO$_3$ in which Ba and/or Ti is partially replaced with other elements. More specifically, barium (Ba) may be partially replaced with other elements, such as, for example, strontium (Sr) and calcium (Ca), and titanium (Ti) may be partially replaced with other elements, such as, for example, zirconium (Zr) and hafnium (Hf). The molar ratio of the A site element (e.g., Ba, Sr, Ca) to the B site element (e.g., Ti, Zr, Hf) in the BaTiO$_3$-based compound is not strictly limited to 1:1. The molar ratio of the A site element to the B site element may fluctuate as long as the compound maintains the perovskite crystal structure.

In addition to barium (Ba) and titanium (Ti), the dielectric ceramic layers further include a rare earth element (Re). The rare earth element (Re) is a generic term for elements in the group consisting of scandium (Sc) with atomic number 21, yttrium (Y) with atomic number 39, and elements ranging from lanthanum (La) with atomic number 57 to lutetium (Lu) with atomic number 71 in the periodic table. The dielectric ceramic layers may include one type of rare earth element, or may include a combination of plural types of the rare earth elements. The rare earth element may be included only in the BaTio$_3$-based compound as the main crystal grains, or may be included in a grain boundary or at a triple junction, as well as in the main crystal grains. When the rare earth element is included in the main crystal grains, it may occupy the Ba site (A site), the Ti site (B site), or both sites in the BaTiO$_3$-based compound.

Addition of a rare earth element (Re) to the dielectric ceramic layers makes it possible to improve various characteristics, such as reliability of the multilayer ceramic capacitor and temperature characteristics of permittivity. That is, for example, the main component BaTiO$_3$ may include a lot of oxygen vacancies produced in a firing step. The oxygen vacancies tend to lower insulation resistance when electron compensation is involved, and also tend to migrate under an electric field, resulting in a decrease in the insulation resistance over time. When a rare earth element is added to a dielectric ceramic layer, the rare earth element tends to form a solid solution at the Ba or Ti site of the BaTiO$_3$-based compound. The rare earth element, which forms a solid solution, defines and functions as a donor or an acceptor, to reduce or prevent the migration of oxygen vacancies or reduce or prevent generation of conductive electrons. Therefore, degradation of insulation resistance is reduced, improving a high-temperature load life. The temperature dependence of the permittivity of the BaTiO$_3$-based compound is large around the Curie temperature Tc. By making the rare earth element form a solid solution, the temperature-dependent change in permittivity can be made flatter over a wide range of temperatures including the Curie temperature Tc.

The type of rare earth element (Re) included in the dielectric ceramic layers is not particularly limited. However, it is preferable to include, for example, at least one selected from the group consisting of yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). It is particularly preferable to include, for example, dysprosium (Dy). Dy is an element located around the middle of the lanthanoid group in the periodic table, and its ion radius is also about the middle. Therefore, Dy can occupy both of the Ba site (A site) and the Ti site (B site) in a BaTio$_3$-based compound, which is effective in improving reliability. The dielectric ceramic layers may include only Dy as the rare earth element, or may include another rare earth element together with Dy.

Addition of an appropriate amount of the rare earth element (Re) to the dielectric ceramic layers enables the advantageous effect of improving the characteristics to be more significantly achieved. A dielectric ceramic layer preferably includes, for example, a rare earth element (Re) in a content of about 0.1 mol or more and about 35.0 mol or less, more preferably about 0.5 mol or more and about 30.0 mol or less, and even more preferably about 3.5 mol or more and about 25.0 mol or less with respect to 100 mol of titanium (Ti). The number of moles is the number of moles as a raw material.

The dielectric ceramic layer may include an additive component other than the rare earth element (Re). Examples of such a component include manganese (Mn), magnesium (Mg), silicon (Si), aluminum (Al), and vanadium (V). The additive component may be present in any form. The additive component may exist in or at any of the main component particles, the grain boundary, and the triple junction.

The dielectric ceramic layers preferably have a thickness of, for example, about 0.5 μm or more and about 7.0 μm or less. The dielectric ceramic layers with a thickness of about 0.5 μm or more can prevent a decrease in insulating characteristics and produce improved reliability. On the other hand, the dielectric ceramic layers with a thickness of about 7.0 μm or less provides thinner dielectric ceramic layers, resulting in improvement in capacitance. The number of the dielectric ceramic layers is preferably, for example, 50 or more and 1,000 or less.

In the multilayer ceramic capacitor of the present example embodiment, the dielectric ceramic layer includes a rare earth element high-concentration region at an area proportion of, for example, about 50% or more in a cross section including the thickness direction. As used herein, the term thickness direction refers to the direction in which the dielectric ceramic layers and the internal electrode layers are stacked. Thus, the cross section including the thickness direction refers to a plane which passes through the inside of the multilayer ceramic capacitor, and the vertical line of which is perpendicular to the thickness direction, for example, the LT plane or the WT plane. The rare earth element high-concentration region is a region where the molar ratio (Re/Ti ratio) of the rare earth element (Re) to titanium (Ti) is, for example, about 0.04 or more and about 0.30 or less. That is, when the cross section of the dielectric ceramic layer is classified into a rare earth element superhigh-concentration region with a Re/Ti ratio of, for example, about 0.30 or more, a rare earth element high-concentration region with a Re/Ti ratio of, for example, about 0.04 or more and about 0.30 or less, and a rare earth element low-concentration region with a Re/Ti ratio of, for example, less than about 0.04, an area proportion of the rare earth element high-concentration region to a total area of the rare earth element superhigh-, high-, and low-concentrations is, for example, about 50% or more.

By increasing the area ratio of the rare earth element high-concentration region to about 50% or more, it becomes possible to significantly improve the reliability of the multilayer ceramic capacitor. Although the detailed reason for this is unclear, it is inferred as follows. The high rare earth element concentration means that an average distance between the positions where the rare earth elements are present is short. The rare earth element has an effect of preventing migration of oxygen vacancies. By shortening the average distance between the rare earth elements, the effect of suppressing the migration of oxygen vacancies increases, resulting in improved reliability. From the viewpoint of improving reliability, it is preferable that the area proportion of the rare earth element high-concentration region be higher. The area proportion may be, for example, about 55% or more, about 60% or more, about 65% or more, about 70% or more, about 75% or more, about 80% or more, about 85% or more, about 90% or more, about 95% or more, or about 100%. However, if the area proportion is excessively high, the permittivity may decrease in some cases. From the viewpoint of improving the permittivity, for example, the area proportion may be about 95% or less, about 90% or less, about 85% or less, about 80% or less, about 75% or less, about 70% or less, about 65% or less, or about 60% or less.

Preferably, in the cross section including the thickness direction, a CV value of Re/Ti ratios in the rare earth element high-concentration region is, for example, about 45% or less. The CV value is an indicator of variation. The smaller the CV value of the Re/Ti ratios, the smaller the variation of the Re/Ti ratios among locations in the rare earth element high-concentration region. By limiting the CV value of the Re/Ti ratios to about 45% or less, the variation in the reliability can be suppressed. Although the reason for this is unclear in detail, it is inferred as follows. If the CV value is large, even though the Re/Ti ratio as the average value is the same, this means in some cases that a region where the Re/Ti ratio is extremely lower than the average value exists, or that the total size of the low Re/Ti ratio regions that are dispersed and arranged is large. The low Re/Ti ratio region may lower reliability. Therefore, a small CV value of the Re/Ti ratios can reduce reliability variation in the sense that reliability does not easily decrease. From the viewpoint of reducing or preventing variations in reliability, a smaller CV value is more preferable. The CV value may be, for example, about 40% or less, about 35% or less, about 30% or less, about 25% or less, about 20% or less, about 15% or less, or about 10% or less. The CV value of the Re/Ti ratios can be obtained by dividing the rare earth element high-concentration region into minute regions, measuring the Re/Ti ratio of each region by a method such as transmission electron microscope (TEM)-energy dispersive X-ray spectroscopy (EDX), and calculating the CV value of the Re/Ti ratios, using the average value and standard deviation $\sigma$, according to the following equation (1).

Formula 1

$$CV \text{ value (\%)} = \frac{\sigma}{\text{Average value}} \times 100 \quad (1)$$

The reliability and variation of the multilayer ceramic capacitor can be evaluated by examining high-temperature load life. The high-temperature load lifetime can be evaluated using mean time to failure (MTTF) and B1 life obtained by conducting high-temperature load tests on capacitors. Specifically, high-temperature load tests are performed on a plurality of capacitors, and time until which insulation resistance drastically decreases is determined as time to failure. The time to failure of each capacitor is subjected to Weibull analysis to obtain a shape parameter m and time to failure at which the cumulative failure rate is about 63.2%, from which the mean time to failure (MTTF) is determined. The time to failure at which the cumulative failure rate becomes 1% is defined as B1 life. It can be determined that the longer the MTTF, the higher the reliability. Further, it can be determined that the larger the B1 life/MTTF, the smaller the variation in the reliability.

The distribution of the rare earth element high-concentration regions included in the dielectric ceramic layer is not particularly limited. The dielectric ceramic layer may have a sea-island structure in a cross section thereof, and the rare earth element high-concentration region and other regions may form a sea portion and an island portion, respectively. Specifically, the other regions, for example, rare earth element low-concentration regions, may be dispersed and arranged in the rare earth element high-concentration region. Alternatively, another possible example embodiment may include a multilayer structure in which the rare earth element high-concentration region and the other regions extend in a layered manner, and each dielectric ceramic layer has a multilayer structure in which the rare earth element high-concentration region and the other regions extend in a layered manner.

Preferably, the dielectric ceramic layer includes a rare earth element low-concentration region in a cross section including the thickness direction. Preferably, the rare earth element low-concentration region includes a plurality of sub-regions, each of which is surrounded by the high-concentration region. Preferably, the sub-regions in the cross section have an average value (average equivalent circle diameter) of equivalent circle diameters of, for example, about 130 nm or more. That is, it is preferable that the dielectric ceramic layer has a sea-island structure in its cross section, the rare earth element high-concentration region defines a sea portion, the rare earth element low-concentration region defines an island portion, and the island portion has an average equivalent circle diameter equal to or greater than a predetermined value. As described above, by dispersing and arranging the rare earth element low-concentration regions having a desired size in the rare earth element high-concentration region in an island shape, it becomes possible to improve the permittivity while ensuring the reliability of the multilayer ceramic capacitor. Although the detailed reason for this is unclear, it is inferred as follows. The rare earth element high-concentration region may have a Curie temperature Tc lower than room temperature depending on the Re/Ti ratio, and at this time, the permittivity decreases. However, by allowing the rare earth element low-concentration regions having a Curie temperature Tc that is sufficiently higher than room temperature to exist, a decrease in the permittivity can be avoided. Since the permittivity accompanies a size effect, a higher permittivity can be obtained by increasing the average equivalent circle diameter of the rare earth element low-concentration region to a predetermined value or more. From the viewpoint of increasing the permittivity, a larger size of the sub-region to be dispersed is preferable. The sub-regions may have an average equivalent circle diameter of, for example, about 140 nm or more, about 150 nm or more, about 160 nm or more, about 170 nm or more, about 180 nm or more, about 190 nm or more, about 200 nm or more, about 210 nm or more, or about 220 nm or more. On the other hand, in order to make the dielectric ceramic capacitor more effectively achieve the effect of improvement in reliability, it is preferable to maintain the size of the rare earth element low-concentration region to a certain level. The sub-regions may have an average equivalent circle diameter of, for example, about 300 nm or less, about 290 nm or less, about 280 nm or less, about 270 nm or less, about 260 nm or less, about 250 nm or less, about 240 nm or less, about 230 nm or less, about 220 nm or less, about 210 nm or less, about 200 nm or less, about 190 nm or less, about 180 nm or less, about 170 nm or less, or about 160 nm or less. The average equivalent circle diameter (D50) is a diameter of a circle having the same area as the cumulative about 50% area. The cumulative about 50% area is a sum of areas of sub-regions when integrating areas of the sub-regions in ascending order until the total reaches about 50%, providing that the total area of all of the sub-regions is about 100%. On the other hand, the average equivalent circle diameter can be calculated by the following equation (2) using the cumulative about 50% area.

Formula 2

$$\text{Average equivalent circle diameter} = \sqrt{\frac{4}{\pi} \cdot (\text{Cumulative 50\% area})} \quad (2)$$

Preferably, in the cross section including the thickness direction, an average value of circularity (average circularity) of the sub-regions defining the rare earth element low-concentration regions is, for example, about 0.70 or more. The circularity, which is an index indicating complexity of a region shape, is 1 in a true circle and becomes smaller as the shape becomes more complex. By making the shape of the rare earth element low-concentration region dispersed and arranged into a circular or substantially circular shape, it becomes possible to reduce or prevent voltage dependency of the high-temperature load life. Although the detailed reason for this is unclear, it is inferred as follows. By increasing the circularity of the sub-regions defining the rare earth element low-concentration region, it becomes possible to reduce the existence probability of a portion having an extremely high curvature at the boundary with a rare earth element high-concentration region. Since the insulation resistance changes depending on the rare earth element concentrations, the insulation resistance is considered to significantly vary, in particular, at the boundary between the rare earth element low-concentration region and the rare earth element high-concentration region. Therefore, the smoother this boundary is, that is, the higher the circularity of sub-regions defining the rare earth element low-concentration region, the electric field concentration can be more effectively reduced or prevented. As a result, a smaller voltage dependency is achieved for the high-temperature load life. The sub-regions may have an average circularity of, for example, about 0.75 or more, about 0.80 or more, or about 0.85 or more. The average circularity can be determined by using areas and perimeters of sub-regions, obtained through TEM observation or the like, calculating the circularity of the sub-regions according to the following equation (3), and subsequently finding an average value thereof.

Formula 3

$$\text{Circulatiry} = \frac{4\pi \times (\text{Area})}{(\text{Perimeter})^2} \quad (3)$$

Preferably, at least one of the crystal grains of a perovskite complex oxide and included in the dielectric ceramic layer includes two or more sub-regions that are not connected to each other. That is, main crystal grains including a plurality of independent sub-regions exist. By providing such a configuration, it becomes possible to obtain an advantageous effect that DC bias characteristics of permittivity are improved. Although the detailed reason for this is unclear, it is inferred that the presence of a rare earth element high-concentration region between the sub-regions that are not connected to each other in the same crystal grain decreases the proportion of DC voltage applied to the sub-regions.

Internal Electrode Layers

The internal electrode layers include a conductive metal. As the conductive metal, a well-known electrode material such as, for example, nickel (Ni), copper (Cu), silver (Ag), palladium (Pd), or an alloy thereof may be used. The internal electrode layer may include components other than the conductive metal. The other components include a ceramic component that acts as a co-material. Examples of the ceramic component include a $BaTio_3$-based compound included in the dielectric ceramic layer.

The internal electrode layers preferably have a thickness of, for example, about 0.3 μm or more and about 0.7 μm or less. By setting the thickness of the internal electrode layer to about 0.3 μm or more, failure, such as electrode breakage, can be suppressed. When the internal electrode layers have a thickness of about 0.7 μm or less, a decrease in the proportion of the dielectric ceramic layers, which electrically function, in the capacitor can be prevented and a resulting decrease in capacitance can be prevented.

External Electrodes

The external electrodes may have known features. For example, the external electrodes may each have a multilayer structure including a base layer, a first plated layer, and a second plated layer, which are arranged in order from the end surface side of the multilayer ceramic capacitor. The base layer includes, for example, a metal, such as nickel (Ni) or copper (Cu). Besides the metal, the base layer may include ceramic particles as a co-material. The first plated layer is, for example, a plated nickel (Ni) layer. The second plated layer is, for example, a plated tin (Sn) layer. An electrically conductive resin layer may be provided between the base layer and the first plated layer. The electrically conductive resin layer may include, for example, a resin and particles of an electrically conductive metal, such as copper (Cu), silver (Ag), or nickel (Ni). The external electrodes may be in any configuration as long as they are electrically connected to the internal electrode layers to function as external input/output terminals.

2. Method for Producing Multilayer Ceramic Capacitor

The multilayer ceramic capacitor according to the present example embodiment may be produced by any method capable of satisfying the requirements described above. A non-limiting example of the method for producing the multilayer ceramic capacitor includes the steps of producing green sheets each including at least barium (Ba), titanium (Ti), and a rare earth element (Re) (green sheet-producing step), applying an electrically conductive paste to the surface of each green sheet to obtain a green sheet having an internal electrode pattern formed (electrode pattern forming step), stacking and pressure-bonding the green sheets to form a multilayer block (stacking step), cutting the resulting multilayer block into multilayer chips (cutting step), subjecting the resulting multilayer chips to binder removal and firing to give base bodies (firing step), and forming external electrodes on each resulting base body (external electrode forming step). Each step will be described in detail below.

Green Sheet Producing Step

The green sheet-producing step includes producing green sheets each including at least barium (Ba), titanium (Ti), and a rare earth element (Re). The green sheet is a precursor of the dielectric ceramic layer of the capacitor and includes a raw material for the main component and an additive raw material of the dielectric ceramic layers. The green sheet may be produced by any known method. The raw material for the main component and the additive raw material may be mixed to form a dielectric raw material. A binder and a solvent may be added to the resulting dielectric raw material to form a slurry. The resulting slurry may be formed into green sheets.

A powder of a $BaTio_3$-based compound is used as the raw material for the main component. The $BaTio_3$-based compound may be synthesized using known ceramic raw materials such as, for example, oxides, carbonates, hydroxides, nitrates, organic acid salts, alkoxides, and/or chelate compounds by a known ceramic synthesis method such as, for example, a solid phase reaction method, a hydrothermal synthesis method, or an alkoxide method. The additive raw material includes at least a rare earth element (Re) raw material. As a Re raw material, known ceramic raw materials such as, for example, oxides, carbonates, hydroxides, nitrates, organic acid salts, alkoxides, and/or chelate compounds of Re may be used. The additive raw material may include raw materials of other additive components such as, for example, Mn, Mg, Si, Al, and V. Further, in order to adjust the composition of the $BaTio_3$-based compound as the main component, a Ba raw material such as, for example, barium carbonate ($BaCO_3$) or a Ti raw material such as titanium oxide ($TiO_2$) may be added to the additive raw material.

The raw materials may be mixed by a known method. For example, the main component raw material, the additive raw material, and water are weighed and then mixed and pulverized together with a pulverizing medium in a ball mill by a wet process. When a wet process is used for the mixing, the resulting mixture may be dried. If necessary, the dielectric raw material obtained after drying may be calcined. The slurry may also be produced by a known method, which may include, for example, mixing the dielectric raw material with an organic binder and an organic solvent. The organic binder may be a known binder, such as, for example, a polyvinyl butyral-based binder. The organic solvent may be a known solvent, such as, for example, toluene or ethanol. If necessary, a plasticizer and any other additive may be added to the slurry. The green sheet may be formed by a known forming method, such as, for example, a doctor blade method or a lip method.

Electrode Pattern Forming Step

The electrode pattern-forming step includes applying an electrically conductive paste to the surface of each green sheet to form an internal electrode pattern. The internal electrode pattern is turned into the inner electrode layer by firing. The electrically conductive paste may include, for example, an electrically conductive metal, such as nickel (Ni), copper (Cu), silver (Ag), palladium (Pd), or an alloy including any of them. A ceramic component to define and function as a co-material may also be added to the electrically conductive paste. As the ceramic component, the main component raw material for the dielectric ceramic layer can be used. The electrically conductive paste may be applied by a known method, such as screen printing or gravure printing.

Stacking Step

The stacking step includes stacking and pressure-bonding the green sheets to form a multilayer block. While, basically, the green sheets are internal electrode pattern-carrying green sheets, some of the green sheets may be internal electrode pattern-free green sheets. The stacking and pressure-bonding may be performed by a known method.

Cutting Step

The cutting step includes cutting the resulting multilayer block into multilayer chips. The cutting may be performed such that chips with a predetermined size will be obtained with at least part of the internal electrode pattern exposed at the end surface of each multilayer chip.

Firing Step

The firing step includes subjecting the resulting multilayer chips to binder removal and firing to give base bodies. The green sheet and the internal electrode pattern are co-sintered by the firing to give the dielectric ceramic layer and the internal electrode pattern, respectively. The conditions for the binder removal may be determined depending on the type of organic binder in the green sheet and the internal electrode pattern. The firing may be performed at a temperature where the multilayer chip can be sufficiently densified. For example, the firing may be performed by holding the multilayer chip at a temperature of about 1,200° C. or more and about 1,300° C. or less for a time period of about 1 hour or more and about 10 hours or less. The firing may be performed in an atmosphere in which the $BaTiO_3$-based compound as a main component undergoes less reduction and the electrically conductive metal is less likely to undergo oxidation. For example, the firing may be carried out in a $N_2$—$H_2$—$H_2O$ stream with an oxygen partial pressure of about $1.9 \times 10^{-11}$ MPa or more and about $6.4 \times 10^{-9}$ MPa or less. The firing may be followed by annealing.

External Electrode Forming Step

The external electrode forming step includes forming external electrodes on each resulting base body. The external electrodes may be formed by a known method. For example, the external electrode may be formed by a process that includes applying an electrically conductive paste including a metal such as silver (Ag), copper (Cu), and/or nickel (Ni) to the end surface at which the internal electrodes are extended and exposed, and baking the electrically conductive paste. Alternatively, the external electrode may be formed by a process that includes applying an electrically conductive paste to both end surfaces of the unfired multilayer chip, and then firing the multilayer chip. The resulting electrode may be used as a base layer, on which a film, such as, for example, a nickel (Ni) or tin (Sn) film may be formed by plating. The multilayer ceramic capacitor is produced in this manner.

EXAMPLES

The present invention will be described in more detail with reference to the following Examples and Comparative Examples. However, the present invention is not limited to the following Examples.

(1) Production of Multilayer Ceramic Capacitor

Examples 1 to 15, 19 to 21, and 24 to 28

Samples of the multilayer ceramic capacitor were fabricated according to the following procedure.

First, a $BaTio_3$ powder having a BET diameter of about 190 nm and a tetragonality of about 1.0099 was prepared as a BT-A powder. As used herein, the tetragonality is an index expressing a degree of tetragonal crystal in the tetragonal crystal system and is represented by a ratio (c/a axis ratio) of a c-axis length to an a-axis length in the tetragonal structure. The degree of tetragonality can be determined by a powder X-ray diffraction (XRD) method. Further, the BET diameter is an average primary particle diameter obtained by conversion of the BET-specific surface area of $BaTiO_3$ powder, assuming that the particles are spherical.

Separately, $BaTiO_3$ powder having a BET diameter of about 100 nm and a degree of tetragonality of about 1.007 was prepared as the BT-B powder and was subjected to wet pulverization to obtain a finely pulverized BT-B powder. The finely pulverized BT-B powder had a BET-specific surface area of about 50 $m^2/g$.

Further, $Dy_2O_3$ powder, $BaCO_3$ powder, and $TiO_2$ powder were individually wet pulverized to produce finely pulverized $Dy_2O_3$ powder, finely pulverized $BaCO_3$ powder, and finely pulverized $TiO_2$ powder, respectively. The finely pulverized $Dy_2O_3$ powder, finely pulverized $BaCO_3$ powder, and finely pulverized $TiO_2$ powder had a BET-specific surface area ranging from about 50 $m^2/g$ to about 56 $m^2/g$.

Next, the BT-A powder, the finely pulverized BT-B powder, the finely pulverized $Dy_2O_3$ powder, the finely pulverized $BaCO_3$ powder, and the finely pulverized $TiO_2$ powder were mixed using a wet mill to obtain compositions shown in Table 1 below, followed by drying to obtain mixed powders. Table 1 also shows A/B ratios, which is a molar ratio of the A site element to the B site element of the perovskite oxide ($ABO_3$). In order to obtain the A/B ratios shown in Table 1, Dy was handled as an element entering any one of the A site and the B site, in relation to composition blending.

The resultant mixed powder was heated to about 1,100° C. at a temperature rising rate of about 600° C./hour in the air and then held for about 2 hours to obtain a calcined powder.

With respect to 100 parts by mole of $TiO_2$ in the calcined powder, about 1.0 part by mole of $MgCO_3$ powder, about 0.3 parts by mole of $MnCO_3$ powder, and about 1.3 parts by mole of $SiO_2$ sol were added to the calcined powder, wet-mixed and dried to obtain a dielectric powder.

A polybutyral-based binder and a plasticizer were added to the obtained dielectric powder, and toluene and ethyl alcohol were further added to the dielectric powder to form a slurry using a wet mill, and the slurry was shaped into a green sheet. The green sheet obtained had a thickness of about 1.7 μm after sintering and densification.

On the surface of the green sheet obtained, a conductive paste including nickel as a main component was screen printed to form a pattern of the conductive paste layer serving as an internal electrode layer.

Then, 201 green sheets each having a conductive paste layer formed on the surface thereof were stacked such that the portions where the conductive paste layers were extended were staggered, green sheet layers each having no conductive paste layer formed thereon were further provided on the top and bottom, and the entire green sheet layers were compressed to produce a multilayer block.

The obtained multilayer block was cut into green multilayer chips. Cutting was performed so that the multilayer ceramic capacitor to be produced would measure about 3.2 mm×about 1.6 mm.

The obtained green multilayer chips were heat treated at about 280° C. in a $N_2$ stream to burn and remove the binder. Subsequently, firing was performed for 2 hours under conditions of about 1260° C. and an oxygen partial pressure of about $1.6 \times 10^{-9}$ MPa in a $N_2$—$H_2$—$H_2O$ stream.

In the fired multilayer chips, a conductive paste including Cu as a main component was applied to an end surface portion at which the internal electrode layer was extended, baked at about 800° C. to form an external electrode, and additionally, a Ni—Sn plating layer was formed on the surface of the external electrode.

As described above, a multilayer ceramic capacitor was produced. The obtained multilayer ceramic compound had an outer shaper of about 3.2 mm long×about 1.6 mm wide×about 1.6 mm thick. The number of dielectric ceramic layers dispositioned between internal electrode layers was 200, and each dielectric ceramic layer was about 1.7 μm thick.

Examples 16 to 18

As the BT-A powder, a $BaTiO_3$ powder having a BET diameter of about 250 nm and a degree of tetragonality of about 1.0100 was used. A multilayer ceramic capacitor was fabricated in the same or substantially the same manner as in Examples 1 to 15, 19 to 21, and 24 to 28 except for the above.

Example 22

As the BT-A powder, a $BaTio_3$ powder having a BET diameter of about 150 nm and a degree of tetragonality of about 1.0095 was used. A multilayer ceramic capacitor was fabricated in the same or substantially the same manner as in Examples 1 to 15, 19 to 21, and 24 to 28 except for the above.

Example 23

As the BT-A powder, a $BaTio_3$ powder having a BET diameter of about 250 nm and a degree of tetragonality of about 1.0100 was wet-pulverized until the BET diameter became about 200 nm and the obtained $BaTiO_3$ powder was used. A multilayer ceramic capacitor was fabricated in the same or substantially the same manner as in Examples 1 to 15, 19 to 21, and 24 to 28 except for the above.

Examples 29 to 32

Rare earth element oxides ($Gd_2O_3$, $Y_2O_3$, $HO_2O_3$, and $Er_2O_3$) corresponding to the rare earth element (Re) species shown in Table 1 were prepared. These rare earth element oxides were individually wet-pulverized until the BET specific surface area was in the range of about 50 $m^2/g$ to about 60 $m^2/g$ to obtain finely-pulverized Re oxide powders. The raw material powders (BT-A powder, finely pulverized BT-B powder, finely pulverized Re oxide powder, finely pulverized $BaCO_3$ powder, and finely pulverized $TiO_2$ powder) were mixed and dried to obtain the compositions shown in Table 1 below, and mixed powders were obtained. In relation to composition blending, the rare earth element (Re) was handled as elements entering any one of the A site and the B site, and blending of the raw material was performed so that the A/B ratios shown in Table 1 below were obtained. Multilayer ceramic capacitors were fabricated in the same or substantially the same manner as in Examples 1 to 15, 19 to 21, and 24 to 28 except for the above.

Examples 33 to 37

Rare earth element oxides ($Dy_2O_3$, $La_2O_3$, $Nd_2O_3$, $Tb_4O_7$, $Yb_2O_3$, $Lu_2O_3$, $Eu_2O_3$, $Sm_2O_3$, $CeO_2$ $Pr_6O_{11}$ and $Tm_2O_3$) corresponding to the rare earth element (Re) species shown in Table 1 were prepared. These rare earth element oxides were individually wet-pulverized until the BET specific surface area was in the range of about 50 $m^2/g$ to about 60 $m^2/g$ to obtain finely-pulverized Re oxide powder. The raw material powders (BT-A powder, finely pulverized BT-B powder, finely pulverized Re oxide powder, finely pulverized BaCO$_3$ powder, and finely pulverized TiO$_2$ powder) were mixed and dried to obtain the compositions shown in Table 1 below and mixed powders were obtained. At the time of blending of raw materials, the addition amounts of the rare earth elements other than Dy were all about 0.1 parts by mole. La, Nd, Eu, Sm, Ce, and Pr were handled as elements entering the A site in relation to composition blending. Tb, Yb, Lu, and Tm were handled as elements entering the B site in relation to composition blending. Dy was handled as elements entering any one of the A site and the B site in relation to composition blending. In consideration of these, raw materials were blended so as to obtain the A/B ratios shown in Table 1. A multilayer ceramic capacitor was fabricated in the same or substantially the same manner as in Examples 1 to 15, 19 to 21, and 24 to 28 except for the above.

(2) Evaluation

The multilayer ceramic capacitors obtained in Examples 1 to 37 were evaluated for characteristics as shown below.

TEM Observation/EDX Analysis

The dielectric ceramic layers of the multilayer ceramic capacitors were observed using a field emission transmission electron microscope (FE-TEM), and a component analysis of fine regions was performed using an energy dispersive X-ray spectrometer (EDX) attached to the TEM. The observation sample was prepared by thin-cutting the dielectric ceramic layer by an FIB lift-out method. Observation and analysis were performed under the following conditions.

Instrument: JEOL, JEM-2200FS/Noran System 7
Field of view: n=2
Magnification: about 60,000 times
Pixel size: about 9.2 nm/1 pixel
Spot diameter: about 1 nm φ
Measurement: number of EDX integration: 100

In observation, a dielectric ceramic layer in an observation field of view was extracted, a region having a Re/Ti ratio of about 0.04 or more and about 0.30 or less was defined as the rare earth element high-concentration region, and an area ratio thereof was calculated according to the following equation (4). Further, the Re/Ti ratio of each pixel in the rare earth element high-concentration region was measured, and from the average value and the standard deviation σ thereof, the CV value was calculated according to the following equation (1).

Formula 4

$$\text{Area ratio of rare earth element high} - \text{concentration region (\%)} = \frac{\text{Pixel number of rare earth element high-concentration region}}{\text{Pixel number of dielectric ceramic layer}} \times 100 \quad (4)$$

Formula 5

$$CV \text{ value (\%)} = \frac{\sigma}{\text{Average value}} \times 100 \quad (1)$$

Further, a region having a Re/Ti ratio of less than about 0.04 was defined as the rare earth element low-concentration region, and the equivalent circle diameter and circularity of sub-regions defining the rare earth element low-concentration region were determined. Specifically, the boundary lines between the sub-regions that define the rare earth element low-concentration regions and the rare earth element high-concentration region were drawn with a touch pen. The obtained data was analyzed using image analysis software (Mitani, WINROOF) to obtain the area and perimeter of each sub-region. Further, given that a total area of each sub-region is 100 (100%), areas of the sub-regions were integrated in ascending order. The area of sub-regions when the sum of the areas reached about 50% of the total was obtained. Then, using this cumulative about 50% area, the average equivalent circle diameter (D50) was calculated according to the following equation (2). The circularity of each sub-region was determined according to the following equation (3), and the average value thereof was calculated.

Formula 6

$$\text{Average equivalent circle diameter} = \sqrt{\frac{4}{\pi} \cdot (\text{Cumulative 50\% area})} \quad (2)$$

Formula 7

$$\text{Circulatiry} = \frac{4\pi \times (\text{Area of each sub-region})}{(\text{Perimeter of each sub-region})^2} \quad (3)$$

Dielectric Characteristics

The resulting multilayer ceramic capacitors were measured for capacitance (C) under the conditions of about 1 kHz and an AC voltage of 1 V using an automatic bridge meter. The relative permittivity (Er) was calculated using a counter electrode area of the multilayer ceramic capacitor and the number and thickness of the dielectric ceramic layers. With regard to 72 samples produced under the same or substantially the same conditions, the relative permittivity was measured, and the average of the obtained values was calculated.

Reliability (MTTF, B1 Life)

A high accelerated life test (HALT) was performed on the multilayer ceramic capacitors to obtain mean time to failure (MTTF). In the high accelerated life test, a high temperature load was applied to samples under conditions at a temperature of about 175° C. and a test voltage of about 50 V. The time at which the insulation resistance became about 200 kΩ or less was defined as the mean time to failure. The mean time to failure was measured for 72 samples produced under the same conditions.

Next, the obtained data was plotted on a Weibull probability paper to obtain a Weibull distribution. In the obtained Weibull distribution, the relationship between time to failure and accumulated failure rate was analyzed by linear regression, and the slope thereof was obtained as a shape parameter m. Further, time to failure at which the cumulative failure rate reached about 63.2% was read, and mean time to failure (MTTF) at a test voltage of about 50 V was determined using this time to failure and the shape parameter m corresponding to the slope of the regression linear line. Then, a sample having MTTF of about 50 hours or more was determined as an accepted product. The time to failure at which the accumulated failure rate became about 1% was defined as B1 life. Then, B1 life/MTTF was calculated by percentage notation.

Further, the high accelerated life test was performed under the same conditions except that the test voltage was changed to about 60 V, the meant time to failure (MTTF) at the test voltage of about 60 V was determined, and a decrease in the MTTF was calculated according to the following equation (5).

Formula 8

$$\text{Decrease in } MTTF(\%) = \frac{(MTTF \text{ at test voltage of } 60\text{ V})}{(MTTF \text{ at test voltage of } 50\text{ V})} \times 100 \quad (5)$$

(3) Evaluation Results

The evaluation results obtained for Examples 1 to 37 are summarized in Table 1. The MTTF shown in Table 1 is a value measured under the condition of the test voltage of about 50 V, except for decreases in MTTF.

In the Example samples (Examples 1 to 9, 13 to 27, and 29 to 37) where the area ratio of rare earth element high-concentration region was about 50% or more, MTTF was about 52 hours or more. In particular, in samples where the rare earth element (Re) was Dy and the area ratio was about 80% or more (Examples 6, 8, 13, 19, and 20), MTTF was as long as about 149 hours or more. On the other hand, in the Comparative Example samples (Examples 10 to 12 and Example 28) where the area ratio was less than about 50%, MTTF was as short as about 39 hours or less. From these results, it was discovered that a highly reliable multilayer ceramic capacitor can be obtained by increasing the area ratio of rare earth element high-concentration region to about 50% or more.

In the Example samples (Examples 1 to 9, 13 to 24, 26, 27, and 29 to 37) where the CV value of the Re/Ti ratios was about 45% or less, B1 life/MTTF was about 25% or more, and the variation in the time to failure was small. Further, in the Example samples (Examples 1 to 9, 13 to 18, 20, 21, 23 to 27, and 29 to 37) where the equivalent circle diameter of the rare earth element low-concentration region was about 130 nm or more, the relative permittivity Er was about 2500 or more. Further, in the Example samples (Examples 1 to 9, 13 to 18, 20 to 22, 24 to 27, and 29 to 37) where the circularity of the rare earth element low-concentration regions was about 0.70 or more, decrease in MTTF was about 60% or less. From these results, it was discovered that by setting the CV value of the Re/Ti ratios and the equivalent circle diameter and/or circularity of the rare earth element low-concentration regions within a predetermined range, variation in reliability and voltage dependency can be reduced or prevented and permittivity can be improved.

Figure 4A:
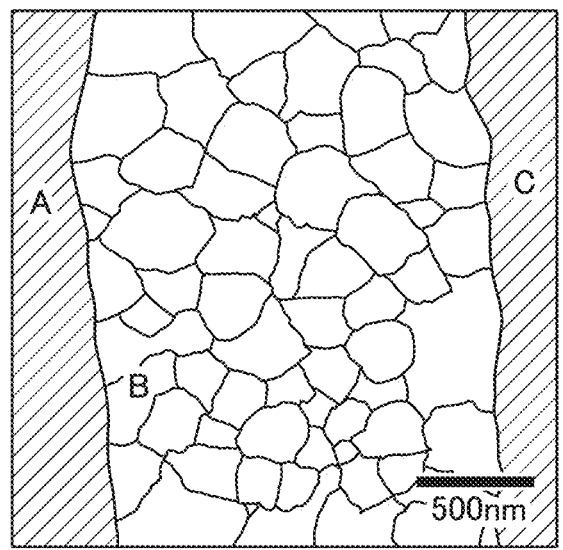
FIGS. 4A and 4B are cross sectional views schematically showing a fine structure of a multilayer ceramic capacitor according to an example embodiment of the present invention.
Figure 4B:
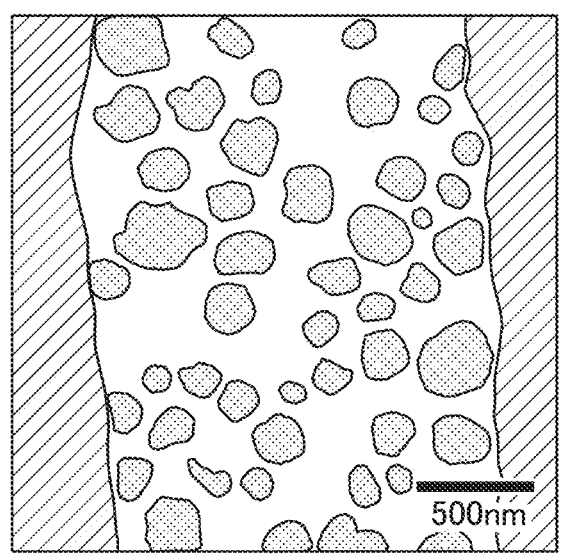

FIGS. 4A and 4B schematically show fine structures and element distribution of cross sections of the multilayer ceramic capacitors obtained in the Examples. FIG. 4A is a diagram showing a cross sectional fine structure, where point A and point C in the diagram represent internal electrode layers, and point B represents a dielectric ceramic layer. FIG. 4B is an element distribution diagram showing the distribution of Dy. In FIG. 4B, a region with a high Dy concentration in the dielectric ceramic layer is shown bright, and a region with a low Dy concentration is shown dark. As shown in FIG. 4A, the dielectric ceramic layer is composed of a large number of crystal grains. Further, as shown in FIG. 4B, the Dy distribution is non-uniform, and the Dy low-concentration regions are distributed in an island shape in the Dy high-concentration region. Further, there exist crystal grains including a plurality of independent rare earth element low-concentration regions.

TABLE 1

Production conditions, fine structures and characteristics of multilayer ceramic capacitors

| | Blending composition of dielectric ceramic layer | | | | | | | Fine structure Rare earth element high-concentration region |
| --- | --- | --- | --- | --- | --- | --- | --- | --- |
| | BT-A (parts by mol) | BT-B (parts by mol) | Re species | Re (parts by mol) | BaCO$_3$ (parts by mol) | TiO$_2$ (parts by mol) | A/B | Area ratio (%) |
| Example 1  | 70.80 | 25.00 | Dy | 6.0  | 1.2 | 2.4 | 1.012 | 69  |
| Example 2  | 75.80 | 20.00 | Dy | 6.0  | 1.2 | 2.4 | 1.012 | 63  |
| Example 3  | 70.10 | 25.00 | Dy | 7.0  | 1.2 | 2.8 | 1.012 | 69  |
| Example 4  | 71.15 | 25.00 | Dy | 5.5  | 1.2 | 2.2 | 1.012 | 67  |
| Example 5  | 70.45 | 25.00 | Dy | 6.5  | 1.2 | 2.6 | 1.012 | 68  |
| Example 6  | 54.40 | 40.00 | Dy | 8.0  | 1.2 | 3.2 | 1.012 | 83  |
| Example 7  | 76.00 | 20.00 | Dy | 5.0  | 1.2 | 3.0 | 1.012 | 65  |
| Example 8  | 55.45 | 40.00 | Dy | 6.5  | 1.2 | 2.6 | 1.012 | 80  |
| Example 9  | 70.10 | 25.00 | Dy | 7.0  | 1.2 | 2.8 | 1.012 | 67  |
| Example 10* | 99.00 | 0.00  | Dy | 1.0  | 0.2 | 0.0 | 1.012 | 0   |
| Example 11* | 93.50 | 50.00 | Dy | 1.5  | 1.2 | 1.5 | 1.012 | 0   |
| Example 12* | 92.00 | 50.00 | Dy | 3.0  | 1.2 | 3.0 | 1.012 | 6   |
| Example 13 | 51.40 | 45.00 | Dy | 4.5  | 1.2 | 2.7 | 1.012 | 97  |
| Example 14 | 80.80 | 15.00 | Dy | 6.0  | 1.2 | 2.4 | 1.012 | 54  |
| Example 15 | 69.40 | 25.00 | Dy | 8.0  | 1.2 | 3.2 | 1.012 | 67  |
| Example 16 | 71.00 | 20.00 | Dy | 15.0 | 1.2 | 3.0 | 1.012 | 63  |
| Example 17 | 70.50 | 20.00 | Dy | 19.0 | 1.2 | 0.0 | 1.012 | 60  |
| Example 18 | 73.50 | 15.00 | Dy | 23.0 | 1.2 | 0.0 | 1.012 | 50  |
| Example 19 | 24.00 | 70.00 | Dy | 12.0 | 1.2 | 0.0 | 1.012 | 100 |
| Example 20 | 55.45 | 40.00 | Dy | 6.5  | 1.2 | 2.6 | 1.012 | 80  |
| Example 21 | 65.80 | 30.00 | Dy | 6.0  | 1.2 | 2.4 | 1.012 | 72  |
| Example 22 | 71.15 | 25.00 | Dy | 5.5  | 1.2 | 2.2 | 1.012 | 69  |
| Example 23 | 65.80 | 30.00 | Dy | 6.0  | 1.2 | 2.4 | 1.012 | 74  |
| Example 24 | 76.50 | 20.00 | Dy | 5.0  | 1.2 | 2.0 | 1.012 | 64  |
| Example 25 | 76.50 | 20.00 | Dy | 5.0  | 1.2 | 2.0 | 1.012 | 63  |
| Example 26 | 76.50 | 20.00 | Dy | 5.0  | 1.2 | 2.0 | 1.012 | 59  |
| Example 27 | 81.80 | 15.00 | Dy | 4.0  | 1.2 | 2.4 | 1.012 | 51  |
| Example 28 | 81.50 | 15.00 | Dy | 3.5  | 1.2 | 3.5 | 1.012 | 40  |
| Example 29 | 75.80 | 20.00 | Gd | 6.0  | 1.2 | 2.4 | 1.012 | 62  |

TABLE 1-continued

Production conditions, fine structures and characteristics of multilayer ceramic capacitors

| | | | | | | | | |
|---|---|---|---|---|---|---|---|---|
| Example 30 | 56.15 | 40.00 | Y | 5.5 | 1.2 | 2.2 | 1.012 | 80 |
| Example 31 | 65.80 | 30.00 | Ho | 6.0 | 1.2 | 2.4 | 1.012 | 70 |
| Example 32 | 55.80 | 40.00 | Er | 6.0 | 1.2 | 2.4 | 1.012 | 78 |
| Example 33 | 74.40 | 20.00 | Dy—La—Nd | 7.0 | 1.2 | 4.2 | 1.012 | 65 |
| Example 34 | 75.10 | 20.00 | Dy—Tb | 7.0 | 1.2 | 2.8 | 1.012 | 61 |
| Example 35 | 66.50 | 30.00 | Dy—Yb—Lu | 7.0 | 1.2 | 0.0 | 1.012 | 68 |
| Example 36 | 70.10 | 25.00 | Dy—Eu—Sm | 7.0 | 1.2 | 2.8 | 1.012 | 66 |
| Example 37 | 74.40 | 20.00 | Dy—Ce—Pr—Tm | 7.0 | 1.2 | 4.2 | 1.012 | 62 |

| | Fine structure Rare earth element high-concentration region | Rare earth element low-concentration region | | Characteristics | | | |
|---|---|---|---|---|---|---|---|
| | CV value of Re/Ti (%) | Circle equivalent diameter (nm) | Circularity | Relative permittivity $\varepsilon_r$ | MTTF (hr) | Decrease in MTTF (%) | B1 life/ MTTF (%) |
| Example 1 | 21.7 | 185 | 0.87 | 3700 | 70 | 50 | 35 |
| Example 2 | 31.8 | 189 | 0.86 | 3400 | 63 | 51 | 33 |
| Example 3 | 25.2 | 175 | 0.86 | 2700 | 129 | 50 | 33 |
| Example 4 | 20.0 | 174 | 0.86 | 2900 | 104 | 51 | 39 |
| Example 5 | 16.1 | 180 | 0.85 | 3100 | 135 | 53 | 45 |
| Example 6 | 14.0 | 187 | 0.87 | 3100 | 229 | 50 | 50 |
| Example 7 | 29.3 | 207 | 0.89 | 3200 | 77 | 51 | 31 |
| Example 8 | 27.2 | 209 | 0.81 | 4100 | 214 | 53 | 36 |
| Example 9 | 31.2 | 203 | 0.80 | 3300 | 140 | 52 | 34 |
| Example 10* | — | — | — | 3600 | 2 | — | 37 |
| Example 11* | — | — | — | 3500 | 4 | — | 42 |
| Example 12* | 25.8 | 200 | 0.88 | 3800 | 11 | 52 | 43 |
| Example 13 | 9.6 | 130 | 0.73 | 2500 | 149 | 60 | 61 |
| Example 14 | 36.9 | 193 | 0.80 | 3600 | 55 | 53 | 34 |
| Example 15 | 31.5 | 173 | 0.83 | 2900 | 77 | 52 | 36 |
| Example 16 | 39.9 | 218 | 0.85 | 3400 | 71 | 51 | 29 |
| Example 17 | 42.3 | 225 | 0.86 | 3300 | 67 | 52 | 27 |
| Example 18 | 38.4 | 240 | 0.81 | 2700 | 55 | 55 | 32 |
| Example 19 | 7.5 | — | — | 2500 | 218 | — | 59 |
| Example 20 | 24.3 | 148 | 0.81 | 2900 | 173 | 54 | 40 |
| Example 21 | 32.7 | 160 | 0.83 | 2900 | 110 | 52 | 35 |
| Example 22 | 29.4 | 122 | 0.77 | 2400 | 126 | 57 | 41 |
| Example 23 | 39.6 | 183 | 0.65 | 2600 | 60 | 70 | 29 |
| Example 24 | 45.0 | 174 | 0.87 | 3100 | 88 | 51 | 25 |
| Example 25 | 48.9 | 182 | 0.88 | 3400 | 62 | 52 | 15 |
| Example 26 | 37.8 | 195 | 0.87 | 3800 | 58 | 51 | 31 |
| Example 27 | 42.3 | 188 | 0.81 | 3600 | 52 | 53 | 28 |
| Example 28 | 42.9 | 203 | 0.89 | 4000 | 39 | 50 | 27 |
| Example 29 | 24.3 | 180 | 0.82 | 3000 | 96 | 51 | 37 |
| Example 30 | 26.7 | 155 | 0.70 | 2700 | 69 | 60 | 28 |
| Example 31 | 34.5 | 174 | 0.83 | 3100 | 104 | 55 | 31 |
| Example 32 | 32.4 | 162 | 0.82 | 2900 | 68 | 54 | 30 |
| Example 33 | 23.4 | 168 | 0.80 | 3000 | 66 | 57 | 39 |
| Example 34 | 27.9 | 183 | 0.80 | 3200 | 106 | 56 | 38 |
| Example 35 | 39.3 | 191 | 0.83 | 3400 | 65 | 55 | 27 |
| Example 36 | 37.2 | 178 | 0.78 | 3100 | 66 | 56 | 29 |
| Example 37 | 42.6 | 175 | 0.79 | 2900 | 60 | 54 | 25 |

Note 1)
"*" denotes Comparative Examples.
Note 2)
"A/B" denotes a molar ratio of A site element to B site element of perovskite oxide ($ABO_2$).

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
first and second main surfaces opposite to each other in a thickness direction, first and second side surfaces opposite to each other in a width direction, and first and second end surfaces opposite to each other in a longitudinal direction;
a base body including a plurality of dielectric ceramic layers and a plurality of internal electrode layers, the plurality of dielectric ceramic layers and the plurality of internal electrode layers being stacked in the thickness direction; and
a pair of external electrodes on the first and second end surfaces and electrically connected to the plurality of internal electrode layers; wherein
the plurality of dielectric ceramic layers includes, as a main component, crystal grains including a perovskite complex oxide including barium (Ba) and titanium (Ti), and further including a rare earth element (Re);

the plurality of dielectric ceramic layers include, in a cross section including the thickness direction, a rare earth element high-concentration region in an area proportion of about 50% or more, the rare earth element high-concentration region including the rare earth element in a molar ratio (Re/Ti ratio) of the rare earth element (Re) to titanium (Ti) of about 0.04 or more and about 0.30 or less;

the plurality of dielectric ceramic layers include, in the cross section, a rare earth element low-concentration region having a ratio (Re/Ti) of rare earth element (Re) to titanium (Ti) of less than about 0.04;

the rare earth element low-concentration region includes a plurality of sub-regions, each of which is surrounded by the rare earth element high-concentration region; and the plurality of sub-regions in the cross section have an average value of equivalent circle diameters of about 130 nm or more.

2. The multilayer ceramic capacitor according to claim 1, wherein the plurality of dielectric ceramic layers include, in the cross section, the rare earth element high-concentration region in an area ratio of about 60% or more.

3. The multilayer ceramic capacitor according to claim 1, wherein, in the cross section, a CV value of the Re/Ti ratios in the rare earth element high-concentration region is about 45% or less.

4. The multilayer ceramic capacitor according to claim 1, wherein, in the cross section, a CV value of the Re/Ti ratios in the rare earth element high-concentration region is about 20% or less.

5. The multilayer ceramic capacitor according to claim 1, wherein the plurality of sub-regions in the cross section have an average value of circularity of about 0.70 or more.

6. The multilayer ceramic capacitor according to claim 1, wherein at least one of the crystal grains includes two or more of the plurality of sub-regions that are not connected to each other.

7. The multilayer ceramic capacitor according to claim 1, wherein the multilayer ceramic capacitor has a dimension of about 0.4 mm or more and about 5.7 mm or less in the longitudinal direction, a dimension of about 0.2 mm or more and about 5.0 mm or less in the width direction, and a dimension of about 0.125 mm or more and about 5.0 mm or less in the thickness direction.

8. The multilayer ceramic capacitor according to claim 1, wherein the plurality of dielectric ceramic layers include, in the cross section, the rare earth element high-concentration region in an area ratio of about 70% or more.

9. The multilayer ceramic capacitor according to claim 1, wherein the plurality of dielectric ceramic layers include, in the cross section, the rare earth element high-concentration region in an area ratio of about 80% or more.

10. The multilayer ceramic capacitor according to claim 1, wherein the plurality of dielectric ceramic layers include, in the cross section, the rare earth element high-concentration region in an area ratio of about 90% or more.

11. The multilayer ceramic capacitor according to claim 1, wherein the rare earth element includes at least one of yttrium, lanthanum, cerium, praseodymium, neodymium, samarium, europium, gadolinium, terbium, dysprosium, holmium, erbium, thulium, ytterbium, or lutetium.

12. The multilayer ceramic capacitor according to claim 1, wherein a content of the rare earth element in each of the plurality of dielectric ceramic layers is about 0.1 mole or more and about 35.0 mole or less.

13. The multilayer ceramic capacitor according to claim 1, wherein a content of the rare earth element in each of the plurality of dielectric ceramic layers is about 0.5 mole or more and about 30.0 mole or less.

14. The multilayer ceramic capacitor according to claim 1, wherein a content of the rare earth element in each of the plurality of dielectric ceramic layers is about 3.5 mole or more and about 25.0 mole or less.

15. The multilayer ceramic capacitor according to claim 1, wherein each of the plurality of dielectric ceramic layers includes an additive component of manganese, magnesium, silicon, aluminum, or vanadium.

16. The multilayer ceramic capacitor according to claim 1, wherein a thickness of each of the plurality of dielectric ceramic layers is about 0.5 μm or more and about 7.0 μm or less.

17. The multilayer ceramic capacitor according to claim 1, wherein a number of the plurality of dielectric ceramic layers is 50 or more and 1,000 or less.

* * * * *